United States Patent [19]

Osborn et al.

[11] Patent Number: 5,651,290

[45] Date of Patent: Jul. 29, 1997

[54] MANUAL SHIFTER WITH REVERSE LOCK MECHANISM

[75] Inventors: Charles Osborn, Spring Lake; Robert A. DeJonge, West Olive; Richard L. Meisch, Muskegon; Dale A. Beattie, Muskegon; Robert M. Medema, Muskegon; Dana M. Lee, Muskegon, all of Mich.

[73] Assignee: Grand Haven Stamped Products, Division of JSJ Corp., Grand Haven, Mich.

[21] Appl. No.: 435,791

[22] Filed: May 5, 1995

[51] Int. Cl.⁶ .............................. B60R 25/06; B60K 20/00
[52] U.S. Cl. ................................................ 74/477; 70/247
[58] Field of Search ...................... 74/477, 483; 70/245, 70/247, 252; 677/99

[56] References Cited

U.S. PATENT DOCUMENTS

| | | | |
|---|---|---|---|
| 1,525,993 | 2/1925 | Hurd | 70/247 |
| 1,641,992 | 9/1927 | Reason | 70/247 |
| 1,791,807 | 2/1931 | Doane | 70/247 |
| 1,818,997 | 8/1931 | Martel | 70/247 |
| 4,905,802 | 3/1990 | Gotoh | 70/247 X |
| 5,197,356 | 3/1993 | Kobayashi et al. | 477/99 |
| 5,428,977 | 7/1995 | Knape | 70/247 |
| 5,551,266 | 9/1996 | Behrens | 74/475 |

FOREIGN PATENT DOCUMENTS 343998   11/1921   Germany .................. 70/247

*Primary Examiner*—Khoi Q. Ta
*Attorney, Agent, or Firm*—Price, Heneveld, Cooper, DeWitt & Litton

[57] ABSTRACT

A manual transmission shifter includes a base, and a shift lever pivoted to the base by a ball and socket arrangement. An ignition-key-interlock mechanism includes a bell crank pivoted to the base for movement between a key-interlocked position and a key-released position. The bell crank includes a slot configured to be engaged by a protrusion on the shift lever when the shift lever is moved from neutral to a reverse gear position. The ignition-key-interlock mechanism further includes a key-interlock cable assembly operably connected between the bell crank and the key-receiving ignition device of the vehicle. When the shift lever is moved out of the reverse position, the ignition-key-interlock mechanism is moved to the key-locked position such that the ignition key cannot be removed from the ignition of the vehicle. Alternatively, when the ignition-key-interlock mechanism is moved to the key-released position and the ignition key is removed, the shift lever cannot be removed from reverse until the ignition key is again operably positioned in the ignition.

12 Claims, 5 Drawing Sheets

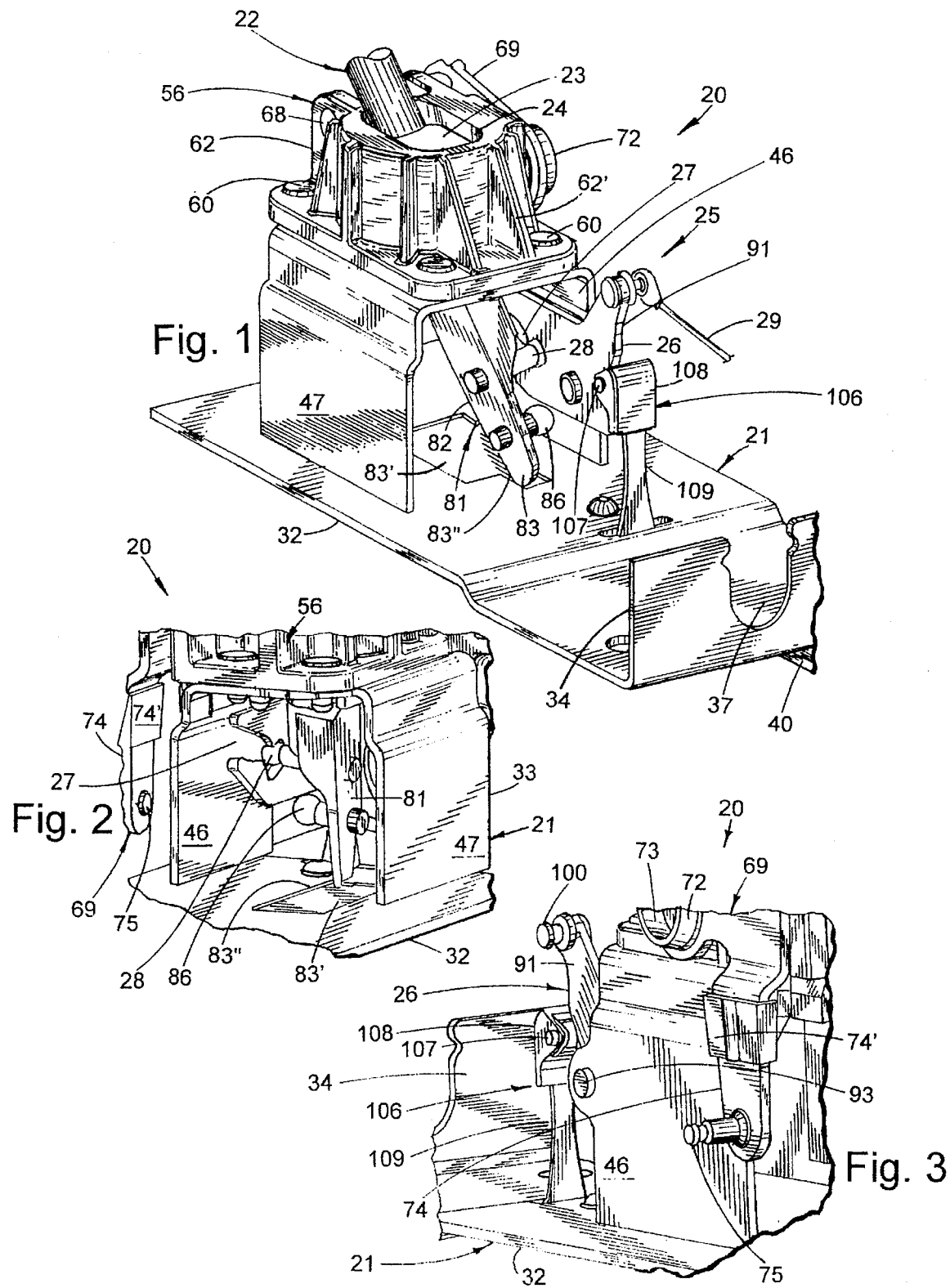

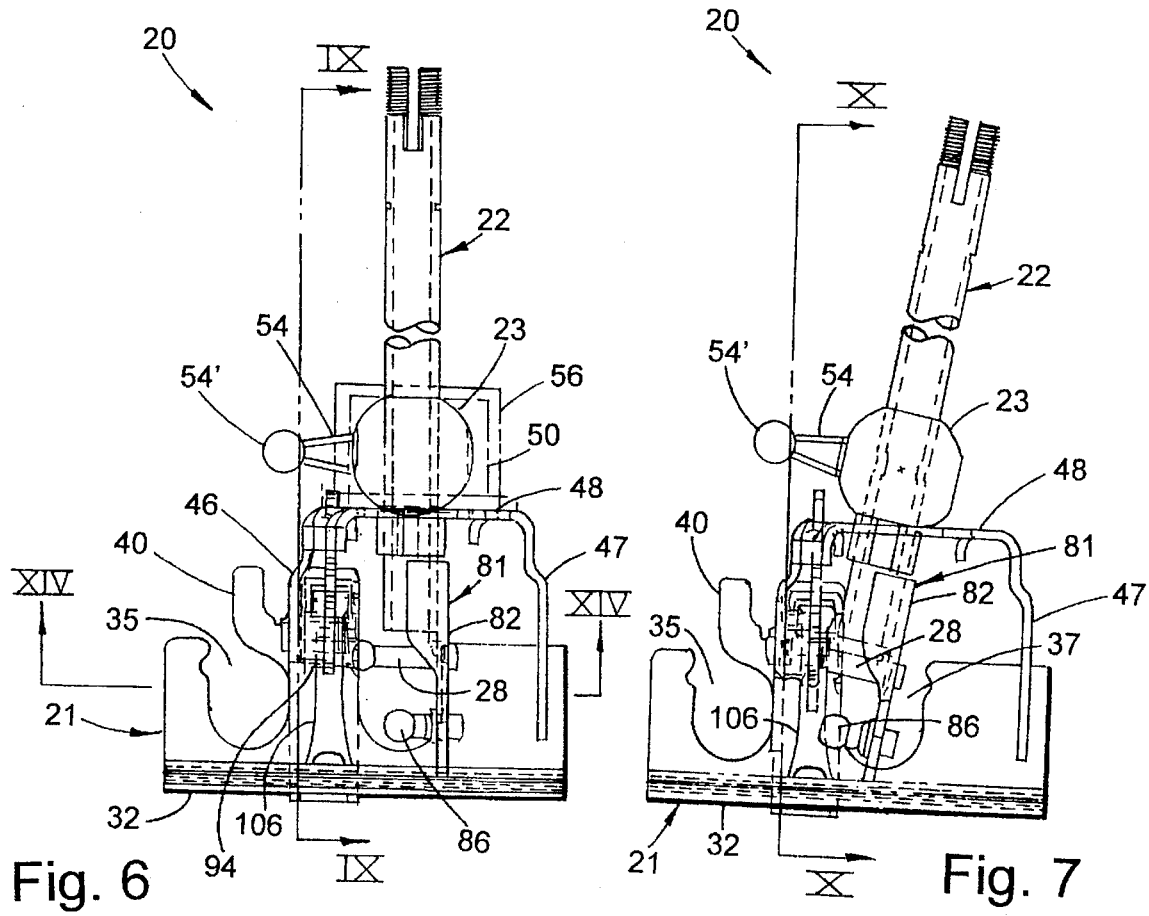
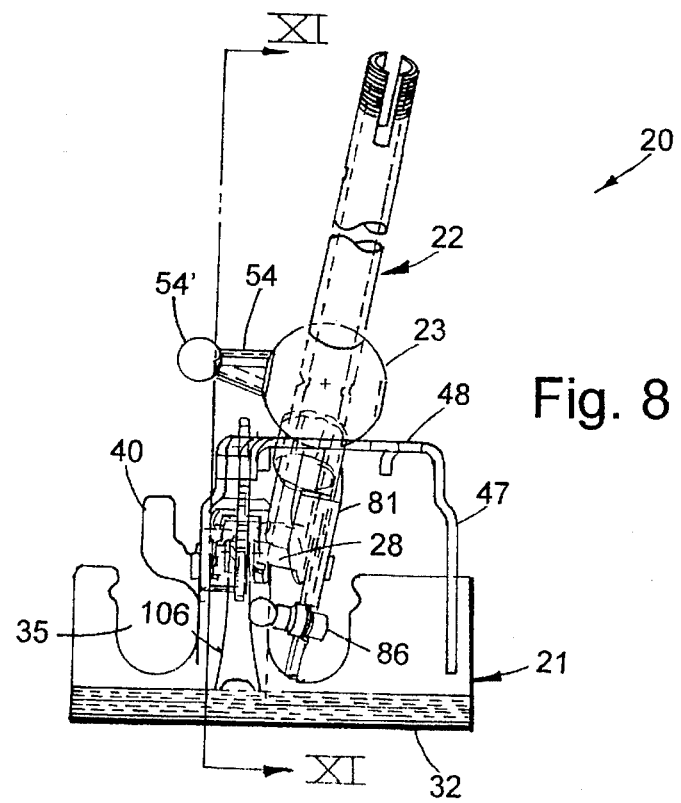

MANUAL SHIFTER WITH REVERSE LOCK MECHANISM

BACKGROUND OF THE INVENTION

The present invention concerns manual transmission shifters for vehicles, and more particularly concerns a manual transmission shifter having an ignition-key-interlock mechanism.

It is important to prevent vehicles having manual transmission shifters from rolling when parked on an inclined surface. Most drivers of a vehicle having a manual transmission either engage a park brake or shift the manual transmission shifter into a gear, such as reverse gear, when parking the vehicle as a matter of habit. However, sometimes a driver will inadvertently forget. When this happens on an incline, the vehicle will begin to roll away unless the driver notices the problem soon enough to get back in the vehicle and press on the brake.

One way of making sure that a driver remembers to place a manual transmission shifter in a gear position is to require the manual transmission shifter to be in a gear position before the ignition key of the vehicle is removed. However, vehicle manufacturers want to accomplish this important function without requiring a cumbersome separate motion by a driver of the vehicle. Further, it is important not to inconvenience the driver. Still further, a shifter incorporating a mechanism to do this should be reliable, low cost, and preferably non-complex.

Accordingly, a shifter for a manual transmission is desired solving the aforementioned problems.

SUMMARY OF THE INVENTION

The present invention includes a manual transmission shifter for a vehicle including a base adapted for mounting to a vehicle, a shift lever, and a pivot for pivotally mounting the shift lever to the base for movement in a shifting pattern between a neutral position and a plurality of gear positions. The shift lever includes a protrusion spaced from the pivot. An ignition-key-interlock mechanism adapted for connection to an ignition-key-receiving device is operably supported on the base for movement between a key-interlocked first position and a key-released second position. The ignition-key-interlock mechanism is configured to engage the protrusion when the shift lever is moved from the neutral position to a predetermined one of the gear positions so that the interlock mechanism is moved from the key-interlocked first position to the key-released second position. These and other features, advantages and objects of the present invention will be further understood and appreciated by those skilled in the art by reference to the following specification, claims and appended drawings.

BRIEF DESCRIPTION OF THE DRAWINGS

FIG. 1 is a fragmentary front perspective view showing a manual transmission shifter position;

FIG. 2 is a fragmentary rear perspective view of the shifter shown in FIG. 1;

FIG. 3 is another fragmentary rear perspective view of the shifter shown in FIG. 1;

FIG. 6 is a rear view of the shifter shown in FIG. 1, the shifter being shown in a centered position in the neutral position;

FIG. 7 is a rear view of the shifter shown in FIG. 6, the shift lever being shown in a laterally pivoted neutral position immediately before shifting to a reverse gear position;

FIG. 8 is a rear view of the shifter shown in FIG. 6, the shifter being shifted to the reverse gear position;

FIG. 15 is a cross-sectional view taken along the plane XVI—XVI in FIG. 14.

DETAILED DESCRIPTION OF PREFERRED EMBODIMENT

Figures 4, 5:
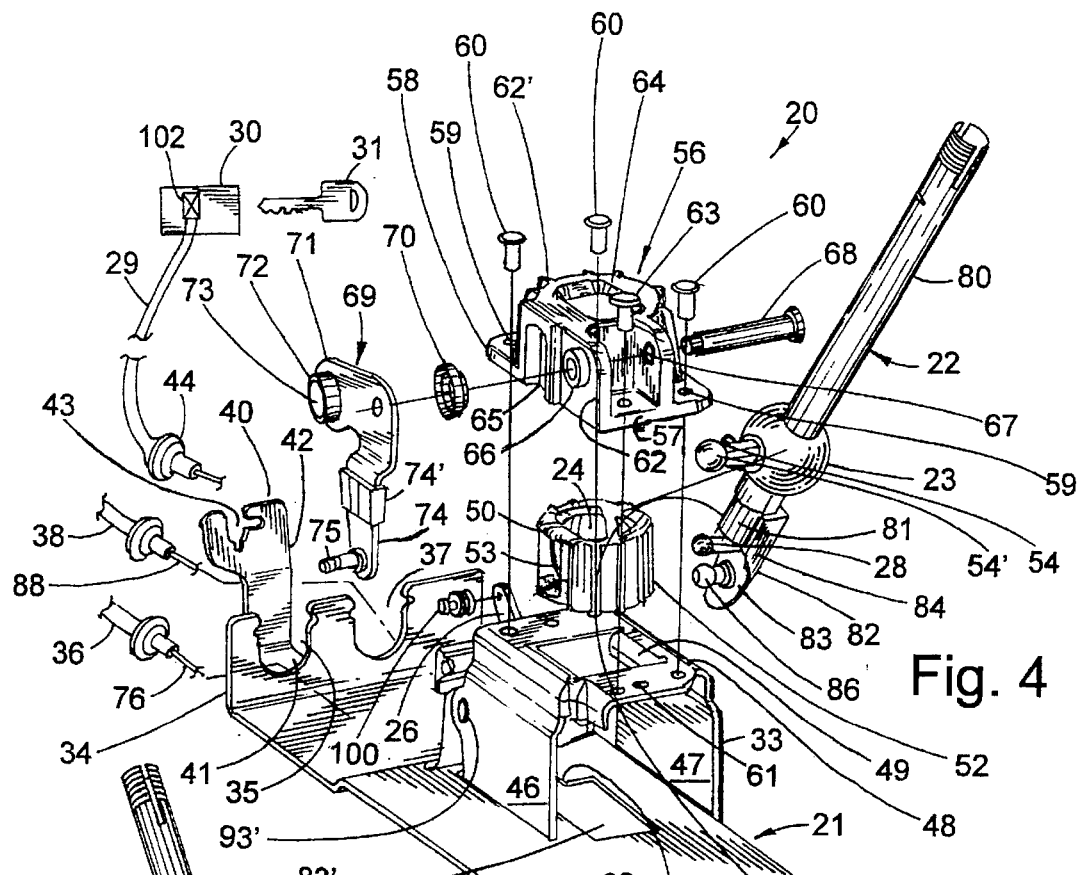
FIG. 4 is an exploded rear perspective view of the shifter shown in FIG. 1.
FIG. 5 is an exploded front perspective view of the shifter shown in FIG. 1.
Figure 9:
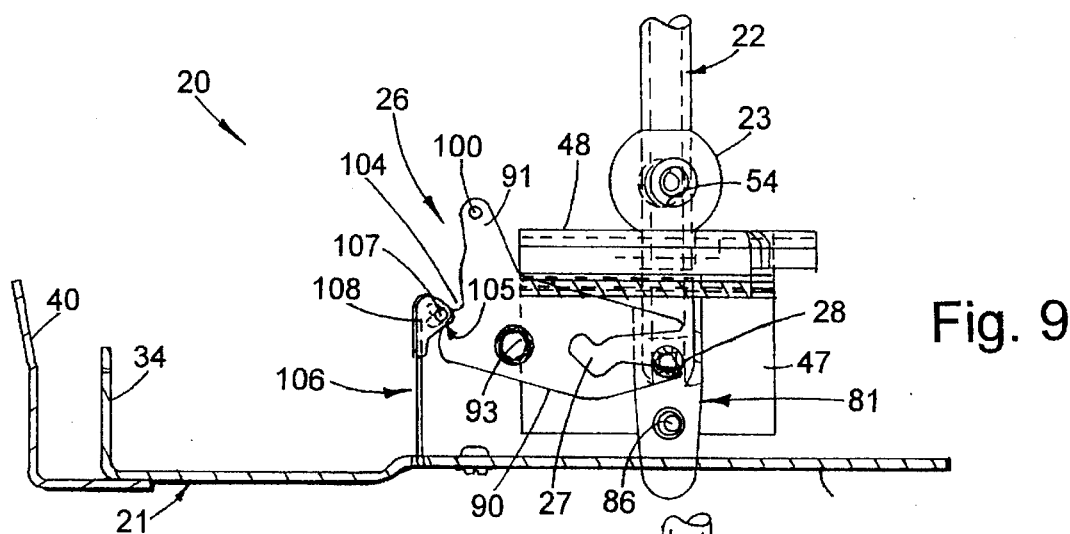
FIG. 9 is a cross-sectional view taken along the plane IX—IX in FIG. 6.

A manual transmission shifter 20 (FIG. 1) embodying the present invention includes a base 21 and a shift lever 22. The shift lever 22 includes a ball 23 and the base 21 includes a socket 24 for pivotally receiving the ball 23 so that the shift lever 22 can be pivoted between various gear positions in a bi-directional shifting pattern, such as an "Hi" shaped shifting pattern commonly used in the art. An ignition-key-interlock mechanism 25 is operably attached to the base 21 and includes a bell crank or cam 26 pivoted to the base 21. The bell crank 26 includes a configured slot 27 positioned for engagement by a protrusion 28 on the shift lever 22 when the shift lever 22 is moved from a neutral position to a reverse gear position. An ignition-key-interlock cable assembly 29 and an ignition key retaining/receiving device 30 (FIG. 4) are operably connected to the bell crank 26 to prevent the ignition key 31 from being removed when the shift lever 22 is not in the reverse gear position. Alternatively, the interlock mechanism 25 prevents the shift lever 22 from being moved out of the reverse gear position unless the ignition key 31 is in the key retaining/receiving device 30. Advantageously, ignition-key-interlock mechanism 25 operates without requiring the driver of the vehicle to perform any cumbersome or other movements that are separate from moving shift lever 22.

More specifically, base 21 (FIG. 4) includes a bottom plate 32 configured for connection to a vehicle, and an inverted U-shaped shift lever support 33 fixed to the bottom plate 32. A front upright flange 34 on bottom plate 32 includes a first aperture 35 configured for connection to a first transmission shift cable assembly 36 and a second aperture 37 configured for connection to a second transmission shift cable assembly 38. An L-shaped bracket 40 includes a lower leg 41 secured to bottom plate 32 below front flange 34. L bracket 40 further includes a vertically extending leg 42 having a third aperture 43 configured to mateably engage the cable sheath 44 on ignition-keyinterlock cable assembly 29. U-shaped support 33 includes sidewalls 46 and 47 and a transverse wall 48 connecting sidewalls 46 and 47. Transverse wall 48 includes an aperture 49 for receiving the lower end of shift lever 22, and walls 46–48 define an operating space for movement of the lower end of shift lever 22. An aperture 83' is located in bottom plate 32 generally between support sidewalls 46 and 47. Aperture 83' is configured to receive the end of lower wall section 83 of shift lever 22 and is configured to permit shift lever 22 to be shifted between gear positions. An end 83" of aperture 83' is extended forwardly on bottom plate 32 to receive a bottom end of leg 81 on shift lever 22 as shift lever 22 is shifted into reverse. The edges of end 83" cooperate to prevent shift lever 22 from accidentally disengaging from bell crank 26 and cam slot 27 when shift lever 22 is in reverse. It is contemplated that aperture 83' may not be needed in all applications. It is also contemplated that shift lever 22 could be held in engagement with bell crank 26 by other means when in reverse, such as by a flange extending upwardly from bottom plate 32 or by a molded part attached to bottom plate 32.

A socket-defining molded structure 50 is secured to the top of transverse wall 48 by a retainer 56. Molded structure 50 (FIG. 4) includes an inner surface that defines the socket 24 and further includes an aperture extending through molded structure 50 for receiving the lower end of shift lever 22. Ribs 52 on molded structure 50 rigidify and support the sidewall 52 of molded structure 50. An aperture 53 extends laterally through sidewall 52 for receiving an arm 54 extending from ball 23. Retainer 56 is a molded assembly including a body 57 for mateably engaging molded structure 50 to securely retain molded structure 50 on transverse wall 48. Flanges 58 extend from retainer body 57 and include holes 59 for receiving screws 60. Screws 60 extend through holes 59 and threadably engage holes 61 in transverse wall 48 to secure retainer 56 to base 21. Locator pins 56' extend from retainer 56 (FIG. 5) into apertures 48' in transverse wall 48 to locate retainer 56 thereon. Ribs 62 and 62' reinforce flanges 58 on body 57. A top wall 63 extends across body 57 and includes an aperture 64 for receiving shift lever 22. A laterally oriented downwardly facing slot 65 is formed in body 57 for receiving arm 54 of shift lever 22. It is contemplated that molded retainer 56 can include surfaces forming the upper portion of socket 24 for supporting ball 23, however, in the present structure, molded structure 50 is made with two mating halves. Other ball and socket connections and other multi-axis pivots are known in the art, and it is contemplated that the scope of the present invention includes same.

A pair of horizontally aligned holes 66 and 67 are located in ribs 62 for supporting a pivot pin 68. A transmission shift bell crank 69 is pivoted on pivot pin 68 and supported by a bushing 70 on pivot pin 68. Bell crank 69 includes an apertured first leg 71. An extruded wall 72 on leg 71 defines a cylindrically-shaped aperture 73 for slideably and rotatably engaging an end of arm 54 as described hereinafter. Bell crank 69 includes a second leg 74 having a universal cable connector 75 thereon for connecting to a transmission shift cable 76 extending from transmission shift cable assembly 36. A bearing pad 74' is located on the inside of leg 74 for reducing the friction between bell crank 69 and side wall 46. Arm 54 extends from ball 23 and includes an enlarged spherical tip 54' that slideably and rotatably engages the aperture 73 in bell crank extruded wall 72. Tip 54' rotates within extruded wall 72 as shift lever 22 is pivoted forwardly/rearwardly into a gear position, but slides and rotates in extruded wall 72 and causes bell crank 69 to rotate as shift lever 22 is moved side-to-side along the length of the neutral position. The rotation of bell crank 69 causes connector 75 to operably move transmission shift cable 76.

Shift lever 22 (FIG. 4) includes a tubular shaft 80 onto which ball 23 is insert-molded. A lower leg 81 of shaft 80 extends below ball 23 and a protrusion supporting member 82 is secured to the bottom of leg 81. Member 82 has a U-shaped cross section and includes a downwardly extending vertical wall section 83, and ribs 84 and 85 that extend from wall section 83 for rigidifying the wall section 83. A universal transmission cable connector 86 is attached to the lower end of wall section 83 for connection to an end of transmission shift cable 88 extending from transmission shift cable 38. The laterally extending protrusion 28 extends from an intermediate location on wall section 83.

Bell crank 26 of ignition-key-interlock mechanism 25 (FIG. 12) includes a first leg 90 having the slot 27 therein, and a second leg 91. A pivot hole 92 is located at the juncture of legs 90 and 91. A pivot pin 93 engages hole 92 and pivotally mounts bell crank 26 to sidewall 46 of base 21, adjacent an inside surface of sidewall 46 (FIG. 5). A hole 93' (FIG. 4) is located in sidewall 46 for receiving pivot pin 93. Bell crank 26 includes an integral molded-in spacer 94 (FIG. 6) that spaces bell crank 26 away from sidewall 46, although it is noted that alternative constructions are contemplated such as use of washers, bearings or the like.

Figure 10:
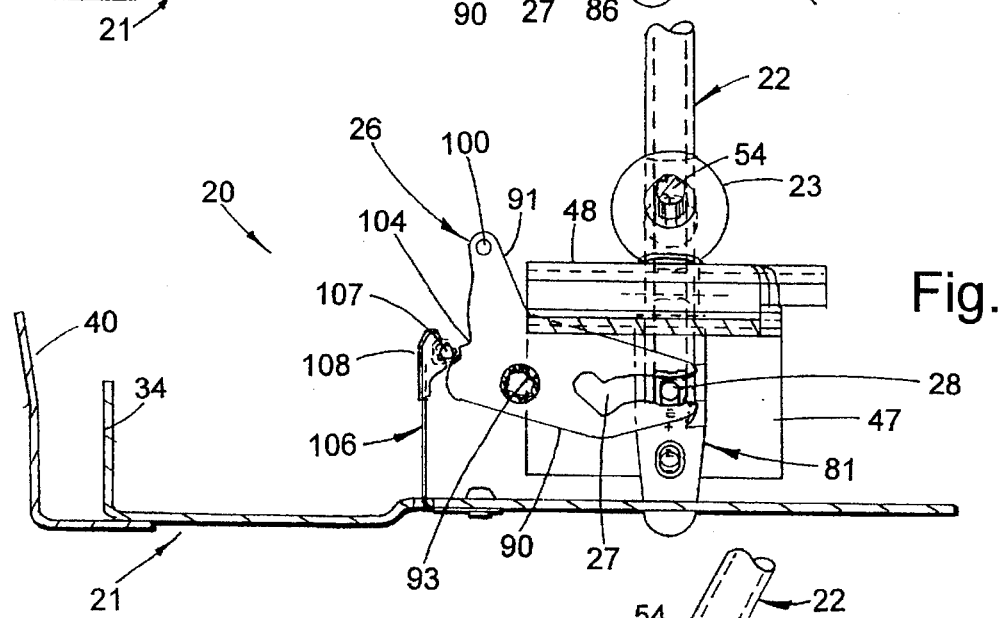
FIG. 10 is a cross-sectional view taken along the plane X—X in FIG. 7.
Figure 12:
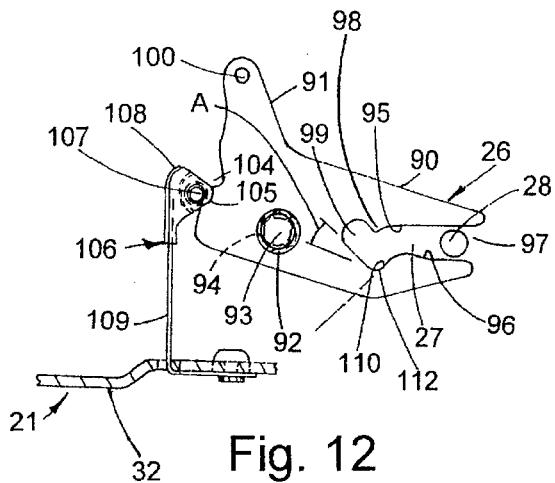
FIG. 12 is an enlarged fragmentary view of the bell crank and detent mechanism shown in FIG. 10.

Slot 27 (FIG. 12) is defined by an upper edge surface 95 and a lower edge surface 96 extending generally toward pivot hole 92. Upper and lower surfaces 95 and 96 define a throat or inlet 97 for receiving laterally extending protrusion 28 as shift lever 22 is pivoted sideways to a neutral position ready to shift into a reverse gear position (FIGS. 7, 10 and 12). Upper surface 95 is inclined with respect to pivot hole 92 and includes a protruding ridge 98 that causes bell crank 26 to rotate about pivot pin 93 as protrusion 28 is moved to an end 99 of slot 27. As shift lever 22 is moved from the neutral position to the reverse gear position, protrusion 28 moves from inlet 97 to closed end 99, respectively.

Leg 91 (FIG. 5) includes a connector 100 configured to attach to a key interlock cable 101 that extends from ignition-key-interlock cable assembly 29. As bell crank 26 is rotated to the key-released position (FIG. 13), connector 100 allows key interlock cable 101 to be retracted. A biasing spring 102' (FIG. 4) in key retaining/receiving device 30 causes key interlock cable 101 to retract. Simultaneously, key retaining/receiving device 30 releases ignition key 31.

The trailing edge 103 of second leg 91 (FIG. 12) includes depressions 104 and 105 corresponding to the key-released position and the key-interlocked positions, respectively, of bell crank 26. A detent mechanism 106 includes a roller 107 that rollingly moves between depressions 104 and 105 of bell crank 26 as bell crank 26 is rotated. Detent mechanism 106 includes a roller holder 108 and a leaf-spring-like arm 109 secured to base plate 32 that biases roller 107 against edge 103. Advantageously, detent mechanism 106 includes parts that are presently used in a feel positioner for an automatic transmission. Detent mechanism 106 provides a feel to the driver of a manual transmission vehicle much like a feel positioner on an automatic transmission vehicle. However, it is contemplated that other detent or locking mechanisms can be used to retain bell crank 26 in a selected position. For example, it is contemplated that locking structures could be attached to sidewall 46, such as a solenoid having an extendable pin with the solenoid being oriented such that the extendable pin can be extended through sidewall 46 into selective engagement with a hole in bell crank 26. In such case, the solenoid would be operably connected to the vehicle electrical system. It is also contemplated that detent mechanism 106 may not be required in all applications.

Lower surface 96 of slot 27 (FIG. 12) includes a surface that extends generally parallel upper surface 95. However, the orientation of an angled surface 110 located proximate but spaced from closed end 99 of slot 27 is important in relation to pivot 93 since, as shift lever 22 is removed out of reverse gear position and protrusion 28 slides along slot 27, protrusion 28 engages angled surface 110 in a manner that provides a positive "feel" to a driver. This is best understood by realizing that if angled surface 110 was perpendicular and centered with respect to pivot pin 93, the protrusion 28 would engage surface 110 and prevent shifting out of reverse gear position. Accordingly, different orientations or angles "A" of angled surface 110 are possible depending upon the feel desired by the vehicle manufacturer and also depending on the strength of the detent mechanism. In the prototype part constructed, angled surface 110 is oriented within a range of angles "A" of about 20° to 30° from a line perpendicular to the location 112 on surface 110 that is closest to pivot pin 93, or preferably at about 30° from perpendicular at that location.

Figure 11:
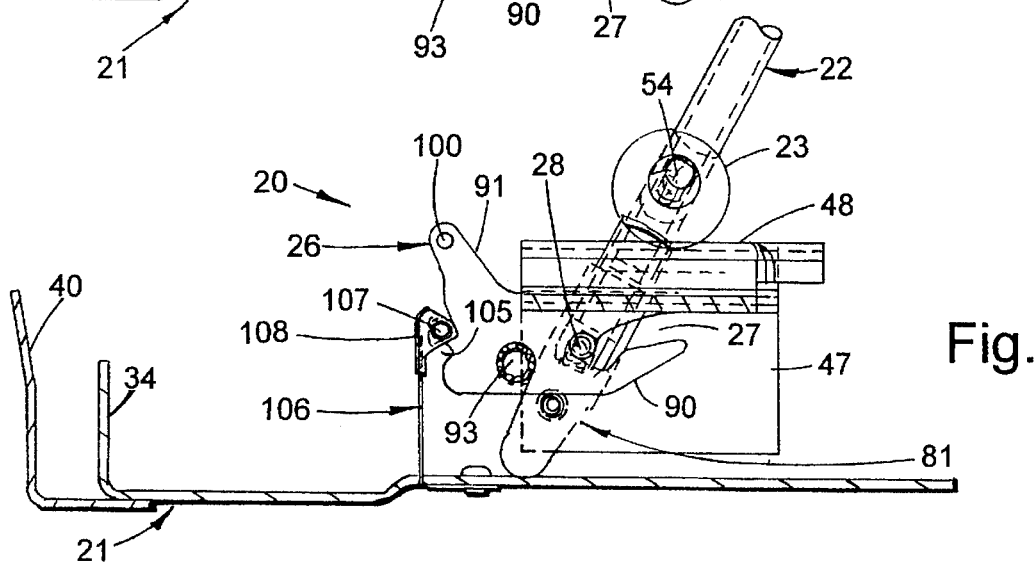
FIG. 11 a cross-sectional view taken along the plane XI—XI in FIG. 8.
Figure 13:
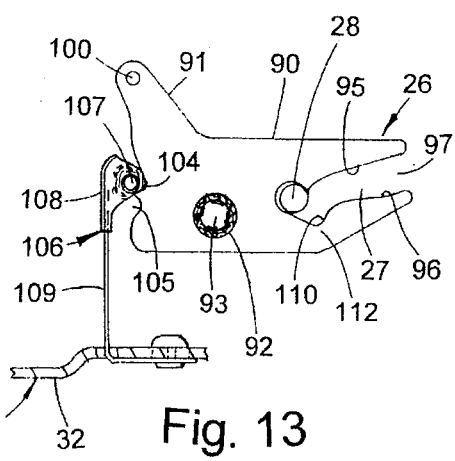
FIG. 13 is an enlarged fragmentary view of the bell crank and detent mechanism shown in FIG. 11.

To operate shifter 20, ignition key 31 is placed in a key retaining/receiving device 30 with shift lever 22 already in reverse (FIGS. 8, 11 and 13). This causes retaining/receiving device 30 to release key interlock cable 101, although it is noted that key interlock cable 101 continues to be held tight by spring 102. As shift lever 22 is moved from the reverse gear position to neutral (FIGS. 7, 10 and 12), protrusion 28 slides along slot 27 causing bell crank 26 to pivot from the key-released position to the key-locked position. The movement of protrusion 28 over angled surface 110 provides a positive feel to the driver during the movement of shift lever 22 as shift lever 22 is moved from reverse to neutral. Once bell crank is pivoted to the key-locked position, protrusion 28 slides free of slot 27 and ignition key 31 is prevented from removal from key retaining/receiving device 30 by the extension of key interlock cable 101.

When ready to park the vehicle, the driver shifts shift lever 22 from the neutral position into the reverse gear position (FIGS. 8, 11 and 13). This causes protrusion 28 to slide into slot 27 and to the end 99 of slot 27. In response, bell crank 26 pivots to the key-released position allowing cable 101 to retract. Thus, the ignition key 31 is released from key retaining/receiving device 30. As ignition key 31 is removed, key interlock cable 101 is locked in a retracted position and bell crank 26 is restricted such that shift lever 22 cannot be pivoted out of the reverse gear position.

Figure 14:
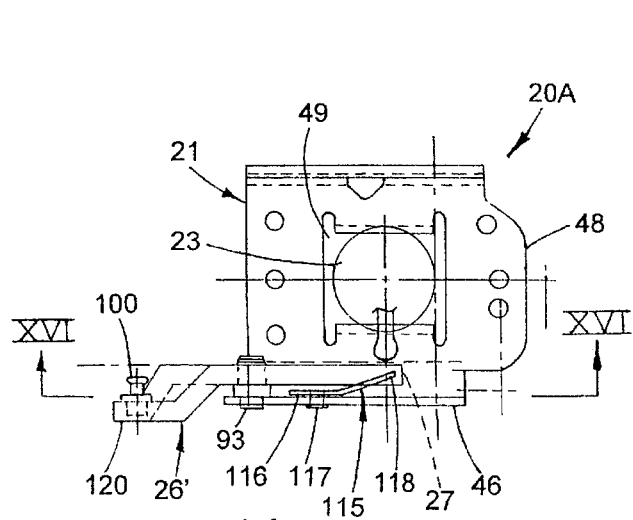
FIG. 14 is a cross-sectional view of a modified shifter having components comparable to the shifter shown in FIG. 1 but also including a bell crank locking mechanism, the cross section being taken along a plane comparable to plane XIV—XIV in FIG. 6.
Figure 15:
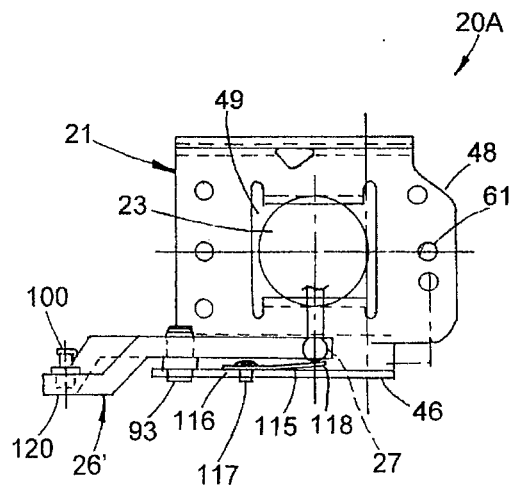
FIG. 15 is a cross-sectional view of the modified shifter shown in FIG. 14 but with the shift lever moved to an end of the neutral position ready for shifting into reverse (comparable to the position of the shift lever in FIG. 7)
Figure 16:
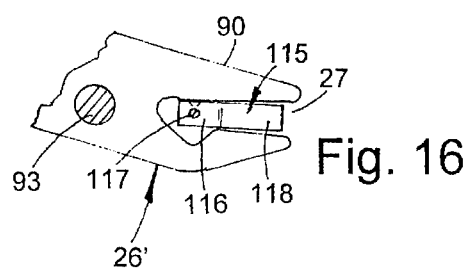

A modified shifter 20A (FIGS. 14-16) includes components and features identical to those in regard to shifter 20, except that a leaf spring lock 115 (FIG. 14) is attached to the inside of sidewall 46 of shifter base 21 and also the detent mechanism (106) is not attached to base 21. Leaf spring lock 115 comprises a spring steel leaf spring having a first end 116 securely and non-rotatably attached to sidewall 46 by rivet 117, and a free end 118 that extends at an angle away from wall 46 into slot 27 of bell crank 26'. Pivot 93 pivotally supports bell clank 26' in a location spaced from sidewall 46. Bell crank 26' is not unlike bell crank 26, but bell crank 26' includes an offset end 120 that positions connector 100 laterally in alignment with aperture 43 on bracket 40. The free end 118 of spring 115 extends into slot 27 (FIGS. 14 and 16) so that it prevents bell crank 26 from being moved out of the key-locked position. When shift lever 22 is pivoted from the center of the neutral position (FIG. 14) to an end of the neutral position ready to shift into reverse (FIG. 15), protrusion 28 moves into slot 27 and engages free end 120 such that free end 120 of leaf spring lock 115 is forced out of slot 27. Since the free end 120 of lock 115 is moved out of slot 27 against or adjacent sidewall 46, lock 115 does not prevent bell crank 26' from rotational movement. However, it is noted that free end 120 frictionally engages the side of bell crank 26' to prevent undesired movement of bell crank 26" as the shift lever 22 is moved into reverse. As shift lever 22 is moved out of reverse, bell crank 26' is pivoted such that slot 27 again aligns with the free end 120 of lock 115. As shift lever 22 is moved away from an end of neutral (FIG. 14), protrusion 28 allows free end 120 of lock 115 to move back into slot 27, thus locking bell crank 26' in the key-locked position.

In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A manual transmission shifter for a vehicle having an ignition-key-receiving device and an ignition-key-interlock cable operably connected thereto for releasably retaining an ignition key in the ignition-key-receiving device, comprising:

a base adapted for mounting to a vehicle;

a shift lever configured to shift a manual transmission;

a pivot for pivotally mounting said shift lever to said base for movement in a two-dimensional shifting pattern between a neutral position and a plurality of gear positions, said shift lever including a protrusion extending laterally from said shift lever and vertically spaced from said pivot; and an ignition-key-interlock mechanism including a bell crank having a cable connector thereon for operable connection to the ignition-key-interlock cable of the vehicle ignition-key-receiving device, said bell crank comprising a vertically extending member having two arms and pivotal on substantially a vertical plane about a horizontal axis located between the ends of said arms; said bell crank being operably supported on said base for pivotal movement between a key-interlocked first position and a key-released second position; one of said arms including said cable connector; the other of said arms including a slot being configured to receive said protrusion when said shift lever is moved from said neutral position to a predetermined one of said gear positions, the configuration of said slot including an upper camming edge and a lower camming edge, one of said upper and lower camming edge shaped to be engaged by said protrusion to pivot said bell crank causing said arms to pivot and actuate said cable whereby said ignition-key-receiving device is actuated from said key-interlocked first position to said key-released second position as said shifter lever is moved to said one gear position.

2. A manual transmission shifter as defined in claim 1 wherein said predetermined one gear position is a reverse gear position, and wherein said other of said upper and lower camming edges includes an angled portion that provides a positive "feel" as said shift lever is moved from said reverse gear position to said neutral position said upper and lower camming edges being shaped to move said ignition-keyinterlock mechanism in a controlled manner between said first position and said second position as said shift lever is being moved.

3. A manual transmission shifter as defined in claim 1 including a second mechanism for holding said ignition-key-interlock mechanism in a selected one of said first position and said second position.

4. A manual transmission shifter as defined in claim 3 wherein said second mechanism includes a roller, and said bell crank includes detented surface for receiving said roller, said detented surface including a first depression corresponding to said first position and a second depression corresponding to said second position.

5. A manual transmission shifter as defined in claim 1 including a lock on said base for holding said bell crank in said key-interlocked position when said protrusion is not engaged with said slot.

6. A manual transmission shifter as defined in claim 5 wherein said lock engages said slot when said bell crank is in said key-interlocked position but is biased out of said slot when said protrusion enters said slot.

7. A manual transmission shifter as defined in claim 6 wherein said lock comprises a leaf spring attached to said base that is engageable by said protrusion to urge said leaf spring out of said slot.

8. A manual transmission shifter as defined in claim 1 wherein said base includes a bottom plate having a surface extending generally beside a bottom leg of said shift lever when said shift lever is in said predetermined one gear position to prevent said shift lever from accidentally disengaging from said slot out of a side of said slot.

9. A manual transmission shifter as defined in claim 1 wherein said ignition-key-interlock mechanism includes a detent and said base includes a detent-engaging mechanism for holding said ignition-key-interlock mechanism in a selected one of said first position and said second position.

10. A manual transmission shifter as defined in claim 1 including an abutting surface on said base for engaging said shift lever to hold said protrusion in engagement with said ignition-key-interlock mechanism when said shift lever is in said predetermined one gear position.

11. A manual transmission shifter as defined in claim 1 wherein said slot includes an inlet end and a closed end, said shift lever while in said neutral position being pivotable in a first direction to engage said protrusion in said inlet end, said shift lever further being pivotable in a second direction generally orthogonal to said first direction to move said protrusion along said slot from said inlet end to said closed end as said shift lever is moved correspondingly from said neutral position to said reverse gear position.

12. A manual transmission shifter as defined in claim 1 wherein said shift lever includes an arm extending from said ball, and including a second bell crank pivoted to said base, said second bell crank including a first leg operably engaged with said arm and a second leg having a transmission-shift-cable third connector thereon, said shift lever being moveable in a first direction when in said neutral position to move said second bell crank and said third connector, said shift lever being moveable in a second direction generally orthogonal to said first direction to move said first connector while said second bell crank remains generally stationary.

* * * * *